Nov. 20, 1962            G. A. MARSH            3,065,408

METHOD OF DETERMINING SOIL CONDUCTIVITY

Filed April 13, 1961

INVENTOR.
GLENN A. MARSH

BY Edward H Lang

ATTORNEY

United States Patent Office 3,065,408
Patented Nov. 20, 1962

3,065,408
METHOD OF DETERMINING SOIL CONDUCTIVITY
Glenn A. Marsh, Crystal Lake, Ill., assignor to The Pure Oil Company, Chicago, Ill., a corporation of Ohio
Filed Apr. 13, 1961, Ser. No. 115,836
7 Claims. (Cl. 324—6)

This invention relates to a novel method for determining the resistivity of the soil layer at the surface of the earth. More particularly, the invention relates to a method for the determination of soil resistivity based upon the attenuation of a radio-frequency signal.

Several methods for determining the resistivity of soil have been proposed and used in the past. Probably the most widely used method is one which employs four, linearly spaced, electrically conductive stakes driven into the ground. A specified current is passed through the soil between the outermost of the four stakes and a voltage drop occurring between the inner two stakes is measured. Utilizing this voltage drop, it is possible to calculate the average soil resistivity to a depth equal to about the spacing of the stakes. Other methods have involved the use of high-voltage alternating current applied to stakes driven into the ground. Ohm's law is used to compute the soil resistivity.

While these prior art techniques provide a reasonable degree of accuracy, the methods are costly and time-consuming when it is necessary to determine soil resistivites over a large area, such as along a proposed pipeline route, and it is desirable to provide more rapid and less expensive means for estimating soil resistivity. It is therefore a primary object of this invention to provide a rapid, convenient and inexpensive method for determining soil resistivity. Another object of this invention is to provide a method for continuously determining the resistivity of soil by means of apparatus which can be conveyed across the surface of the earth, out of contact with the soil.

In brief, the method of this invention comprises supporting a vertical, half-wave antenna adjacent to the surface of the earth, maintaining a receiving antenna adjacent to the surface of the earth and laterally spaced from the transmitting antenna by a distance greater than four wavelengths, transmitting a low-power, radio-frequency signal of suitable frequency from the half-wave antenna, receiving the signal at the receiving antenna, and determining the amplitude and extent of attenuation of the received signal.

Figure 1:
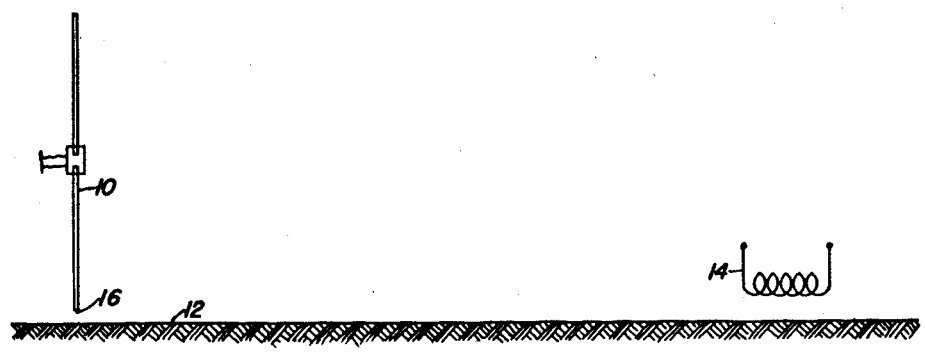
Figure 2:
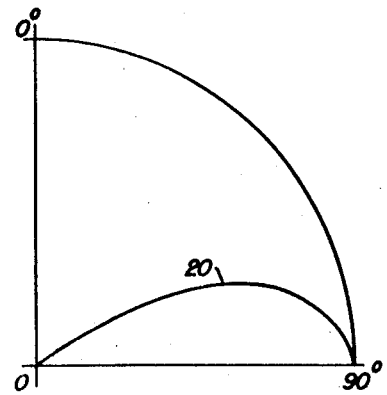
Figure 3:
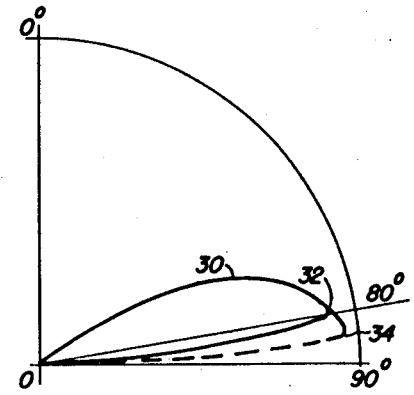

This invention is best described with reference to the drawings, of which,

FIGURE 1 is a schematic view of the transmitting and receiving antennas used in accordance with the method of this invention, FIGURE 2 is a polar diagram of a theoretical radiation pattern of a half-wave antenna supported over ground of zero resistivity, and FIGURE 3 is a polar diagram of the radiation pattern of a half-wave antenna supported over ground of infinite resistivity.

The method of this invention is based upon known radiation patterns around vertical half-wave antennas. Referring to FIGURE 1, a vertical half-wave antenna 10 is supported a short distance, say six inches, above the surface 12 of the earth. Receiving antenna 14 is supported adjacent to the surface of the earth at a distance greater than four wave-lengths from the antenna 10. If the earth 16 were perfectly conducting, that is, of zero resistivity, the polar diagram of FIGURE 2 would be obtained. In this polar diagram, the angle between the vertical and a radius through any point on the curve 20 represents the angle of departure from the vertical at which the radiated signal is received. The radial distance from the same point on curve 20 to the center of the polar diagram represents the amplitude of the received signal. It is apparent, therefore, that in a position directly over the vertical half-wave antenna, the amplitude of the received signal is zero. As the point of signal reception moves from directly over the half-wave antenna, and the angle between the axis of the vertical antenna and a line extending from the antenna to the point of signal reception increases from 0 to 90°, as shown in FIGURE 2, the amplitude of the received signal increases. A maximum amplitude is reached at an angle of 90°, that is, when the direction from the transmitting antenna to the receiving antenna is perpendicular to the axis of the transmitting antenna.

When the half-wave antenna is positioned over soil of infinite resistivity, a radiation pattern as depicted by curve 30 of the polar diagram of FIGURE 3 is obtained. It will be noted that curve 30 is substantially the same as curve 20 where the angle of direction from the transmitting antenna to the receiving antenna is less than about 80° with the vertical. As the angle increases above 80°, i.e., the direction of signal transmission approaches the horizontal, the amplitude of the received signal is greatly attenuated by the high-resistivity soil. Thus, the curve begins to break sharply at about point 32 and reverts towards the axis of the polar diagram. Where the resistivity of the soil is neither zero nor infinite, but between these limits, as is always the case, the curve follows a path such as that represented by the dotted line 34 of FIGURE 3. It is evident that where the receiving antenna is positioned at an angle of less than about 10° from the horizontal, the received wave will be attenuated in inverse proportion to the soil resistivity. Accordingly, when antennas 10 and 14 are positioned, as shown, above the surface of the earth, and a signal of predetermined amplitude is transmitted from antenna 10, the magnitude of the signal received at antenna 14 will be a measure of the resistivity of the soil above which the antennas are positioned.

It is evident that, as a practical matter, a reasonable clearance must be provided between the half-wave antenna 10 and the surface of the earth. This minimum clearance will depend upon the nature of the terrain under study, the height of vegetation growth, and other factors. In general, satisfactory results will be obtained where the lower end 16 of half-wave antenna 10 is positioned at a distance of no more than one-quarter wave-length above the surface of the earth. Preferably, the distance between the lower end 16 and the earth will be considerably less than one foot, and ideally will be only a few inches. Receiving antenna 14 will preferably be positioned at about the same height above the surface of the earth as is the lower end 16 of antenna 10. However, satisfactory results can be obtained when the receiving antenna is positioned no more than about one-half wave-length above the surface of the earth. Where some degree of sensitivity of measurement can be sacrificed, the receiving antenna 14 may be positioned higher, provided the angle from the lowest point of antenna 10 to the lowest point of antenna 14 is not more than 10° above the horizontal. The lateral distance between the transmitting antenna 10 and the receiving antenna 14 should not be less than about four wave-lengths, and preferably will be in the range of about five to twenty wave-lengths. Greater distances may be used, but selectivity with respect to the location tested is decreased, and it is difficult to support very widely spaced antennas for movement across the surface of the earth.

A conventional radio-frequency transmitter of relatively low output may be employed to provide the signal transmitted by the half-wave antenna. The frequency of the transmitted signal is not critical, but a frequency should be selected which will provide convenient physical dimensions for the half-wave antenna and permit convenient spacing of the receiving antenna with respect to the half-wave antenna. The transmitted signal need not be, and preferably will not be, modulated. Conventional radio-receiving means may be employed with receiving antenna 14. Suitable circuits for detecting and measuring the amplitude of the received signal are well known or apparent to those skilled in the art. Preferably, a continuously-recording meter is employed to produce a continuous record of the amplitude of the received signal.

The method of this invention can most conveniently be carried out by supporting the transmitting and receiving antennas from a single vehicle which can be driven across the surface of the earth. The antennas will thereby be maintained at the same elevations and at the same distance from each other. As the vehicle is driven, the amplitude of the received signal will vary in proportion to the resistivity of the soil over which the antennas are moved. The amplitude of the transmitted signal will be maintained constant. It is preferred that the amplitudes of the received signal be continuously recorded by means of a strip chart, the strip chart being driven at a speed proportional to that of the vehicle. In this manner, an accurate record of the resistivity of the soil at each location traversed by the vehicle will be provided. The electronic circuitry and mechanical connections to be employed will be obvious to those skilled in this art. The strip chart may, if desired, be driven in a manner analogous to that conventionally provided in vehicles to drive an odometer.

As a specific example of the method of carrying out this invention, a half-wave antenna having a total length of one-half meter is supported from a rod extending laterally a distance of three meters to the side of a truck. The half-wave antenna is supported vertically with the lower end of the antenna a distance of three inches above the surface of the earth. A loop antenna is supported by means of a support arm extending laterally a distance of three meters to the side of the vehicle. The distance between antennas is five meters. A radio-frequency signal transmitted from the half-wave antenna is received at the loop antenna, and the amplitude for the signal is measured and recorded as a pen trace on a strip chart. The vehicle is positioned successively over a plurality of soils of differing resistivities, the resistivities of these soils having been predetermined by the prior art four-stake technique. The amplitude of received signal corresponding to each of these resistivities is noted, so that the strip-chart trace may be calibrated in terms of soil resistivity. The vehicle is then driven over a route where the resistivity of the soil is to be determined, and a continuous record of soil resistivity is produced by driving the strip chart at a speed proportional to that of the vehicle.

The embodiments of the invention in which an exclusive property or privilege is claimed are defined as follows:

1. A method of determining the conductivity of soil comprising supporting a half-wave rod antenna above the surface of the earth so that the antenna is substantially vertical and the lower end of the antenna terminates within about one-quarter wave-length of the surface of the earth, supporting a receiving antenna above the surface of the earth at a lateral distance of not less than about four wave-lengths from said rod antenna, the lowest point of said receiving antenna being at an angle of not more than about 10° above the horizontal as measured from the lowest point of said rod antenna, transmitting a signal of predetermined amplitude from said rod antenna, receiving a signal at said receiving antenna, and measuring the amplitude of said received signal.

2. The method in accordance with claim 1 in which the lateral distance between said antennas is in the range of five to twenty wave-lengths.

3. The method in accordance with claim 1 in which said receiving antenna is supported at a height of not more than about one-half wave-length above the surface of the earth.

4. The method in accordance with claim 3 in which the lower end of said rod antenna is not more than about one foot above the surface of the earth.

5. The method in accordance with claim 1 including the step of moving said antennas along the surface of the earth while maintaining substantially the same vertical position and lateral spacing of said antennas.

6. The method in accordance with claim 5 in which the amplitude of the received signal is continuously measured as said antennas are moved along the surface of the earth.

7. The method in accordance with claim 6 including the step of recording the measured amplitude of said received signals in correlation with the location of said antennas.

References Cited in the file of this patent

UNITED STATES PATENTS

| | | |
|---|---|---|
| 2,172,688 | Barret | Sept. 12, 1939 |
| 2,994,031 | Slattery | July 25, 1961 |